C. WATSON.
OSCILLATING LAWN SPRINKLER.
APPLICATION FILED SEPT. 29, 1914.
1,155,115.
Patented Sept. 28, 1915.
2 SHEETS—SHEET 1.
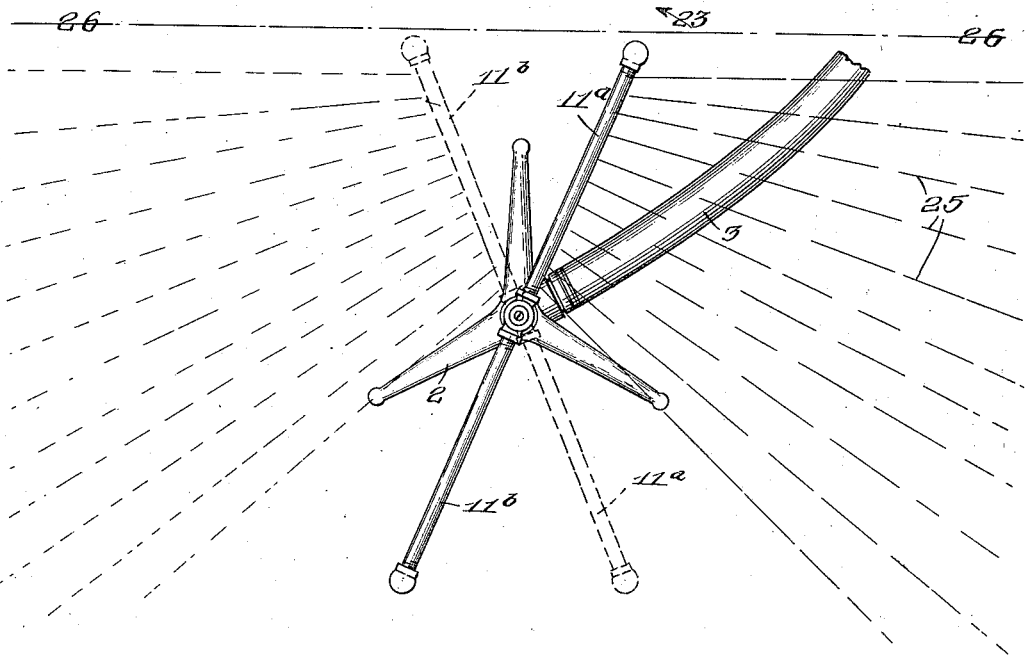
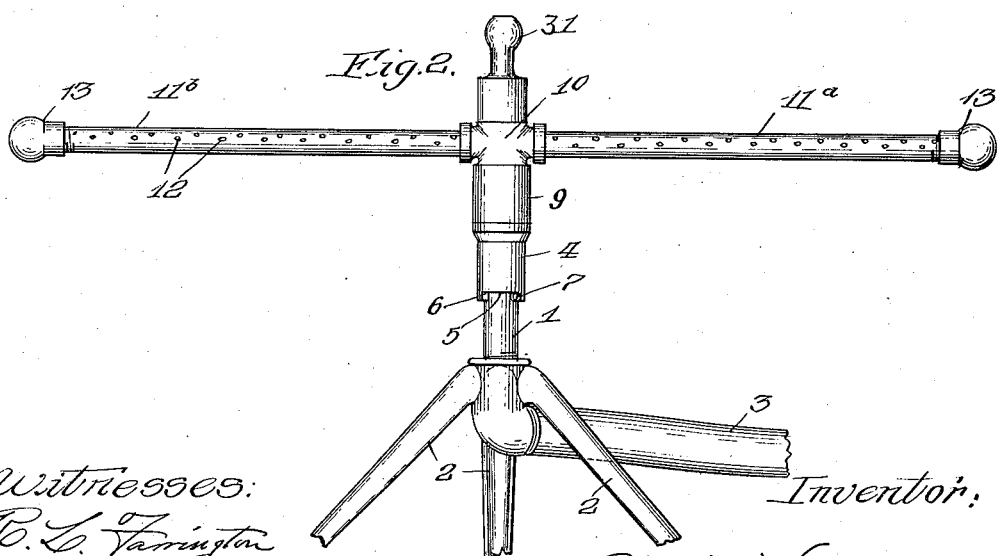

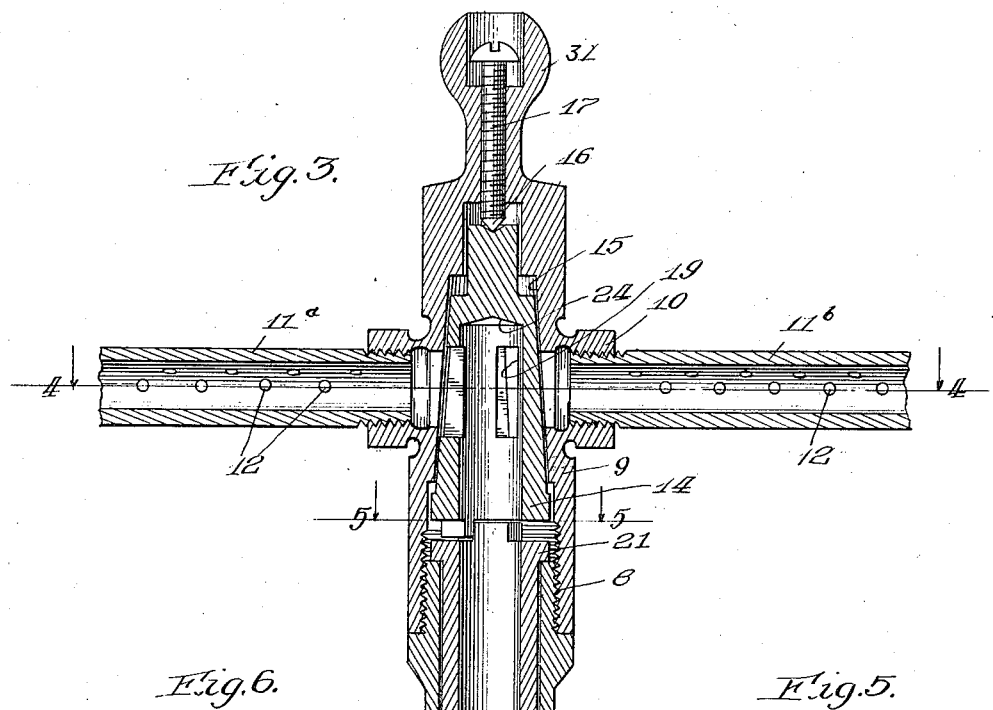
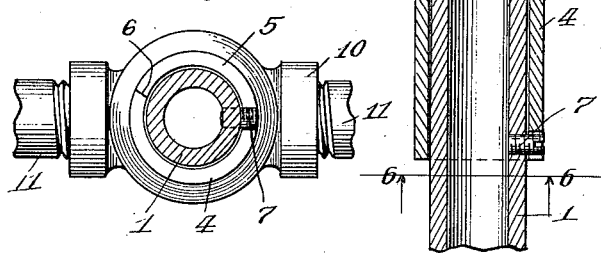
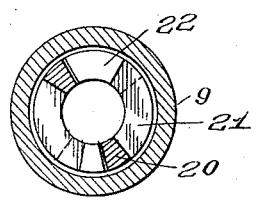
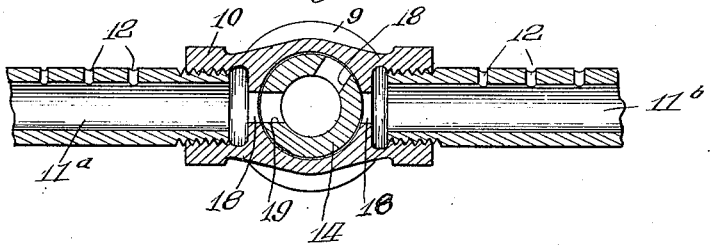

UNITED STATES PATENT OFFICE.

CHARLES WATSON, OF CHICAGO, ILLINOIS.

OSCILLATING LAWN-SPRINKLER.

1,155,115. Specification of Letters Patent. Patented Sept. 28, 1915.

Application filed September 29, 1914. Serial No. 864,106.

*To all whom it may concern:*

Be it known that I, CHARLES WATSON, a citizen of the United States, residing at Chicago, in the county of Cook and State of Illinois, have invented certain new and useful Improvements in Oscillating Lawn-Sprinklers; and I do hereby declare the following to be a full, clear, and exact description of the invention, such as will enable others skilled in the art to which it appertains to make and use the same.

My invention relates to lawn sprinklers, its general object being to provide a sprinkler which will distribute a spray of water substantially over a semi-circle having the sprinkler for its axis.

More particular objects are to provide a lawn sprinkler equipped with a pair of arms extending in opposite directions from the stem of the sprinkler and oscillating about said stem so as to spray water in a substantially semi-circular formation; to provide means whereby the back pressure of the water issuing alternately from one and the other of said arms will cause the said arms to partially rotate about the stem supporting the same; to provide stops for limiting the said partial rotation in each direction; to provide means for shifting the water connection from one to the other of said arms whenever the said arms are approaching one limit of their said partial rotary movement; to provide means for maintaining the water connection through a relatively loosely mounted valve in operative relation to each arm until the valve is positively shifted to its alternative operative position; and to provide simple means for adjusting the fit of said valve.

Other objects will appear from the following specification and from the accompanying drawings, in which—

Figure 1 is a plan view of a sprinkler embodying my invention, showing the direction of the spray from the same when in its extreme positions. Fig. 2 is a fragmentary elevation of the sprinkler. Fig. 3 is a central vertical section through the main portions of the sprinkler. Fig. 4 is a fragmentary horizontal section through Fig. 3 along the line 4—4. Figs. 5 and 6 are horizontal sections through Fig. 3 along the lines 5—5 and 6—6 respectively.

In the embodiment of the drawings, my sprinkler includes a hollow supporting member 1 mounted upon a suitable stand 2 and connected at its lower end through a hose 3 tapping a suitable supply of water. Loosely mounted upon the riser tube 1 is a sleeve 4 equipped at its lower end with a vertical recess 5 affording at its ends a pair of shoulders 6 adapted to engage a screw 7 threaded into the tube 1, which engagement will limit the rotary movement of the sleeve 4 about the tube 1. Fast upon the sleeve 4 and preferably detachably connected thereto by threads 8 is a sprayer member comprising a tubular body portion 9 equipped with a pair of female bosses 10 disposed diametrically opposite each other with respect to the common axis of the body 9 and the tube 1 and equipped at its top with a head 31. Threaded into each of the bosses 10 is a sprayer tube 11 equipped with a plurality of sprayer openings or outlets 12, the said outlets being preferably disposed either horizontally in alinement with the axis of the tube 11 or somewhat above the said axis but not below the latter, and each of the said tubes 11 being closed at its outer end by a cap 13. Interposed between the body 9 of the sprayer member and the upper end of the riser tube 1 and rotatable with respect to both thereof is a valve member 14 consisting of a hollow member having a substantially frusto-conical outer surface corresponding to a tapering bore 15 in the said body 9 of the sprayer member. The valve member 14 is equipped at its upper end with a conical recess adapted to engage the pointed tip 16 of an adjusting screw 17 threaded upon the head 31 of the sprayer member, whereby the said adjusting screw will limit the approaching of the said conical surfaces of the valve member and the sprayer member toward each other.

Substantially in line with the common axis of the sprayer tubes 11, the body member 9 is equipped with a pair of ports 18 of substantially rectangular vertical section corresponding respectively to a pair of ports 19 in the conical portion of the valve member, each of said ports 19 being adapted to aline with one of the said ports 18 when the valve member is in one or another of two positions rotationally separated about the vertical axis of the riser tube 1. The valve member 14 is equipped at its lower end with a pair of lugs 20 depending therefrom, while the upper end of the riser tube 1 (which upper end is preferably equipped with an enlargement 21 for preventing a relative upward movement of the sleeve 4 with respect to said tube) is equipped with a pair of upwardly projecting lugs 22, each of which latter lugs are adapted to engage one or the other of said lugs 20 when the valve member is rotated with respect to the tube 1, thereby limiting the extent of the said rotary movement.

It will be evident from the drawings that water entering the bore of the riser tube 1 will pass freely into the bore of the valve member 14 and from the latter through one of the ports 19 and the corresponding port 18 (Fig. 4) into one of the sprayer arms, while the opposite arm will be disconnected from the supply of water. When the water is thus flowing, the upward pressure thereof against the end 24 of the body of the valve will support the said valve, so that it will not be carried by either the lugs 20 or 22, but will be freely pivoted upon the tip of the screw 16. Then the water supplied to one of the sprayer arms 11 will issue therefrom in a horizontal or slightly inclined direction and the back pressure of the water issuing in the sprays 25 will cause the sprayer arm from which it is issuing (and therefore the other sprayer arm and the member 9 connecting the same) to rotate about the axis of the riser tube 1 of the supporting member. In doing so, the valve 14 will rotate simultaneously with the sprayer member, for the reason that the stream of water flowing through the port 19 into the active sprayer arm will engage the lateral walls of the said port to prevent a motion of the valve member with respect to the sprayer member. Consequently, the valve member will rotate with the sprayer member until one of the lugs 20 on the valve member engages one of the lugs 22 upon the stationary tube 1 of the supporting member, after which the engagement of said lugs will prevent a further rotary movement of the valve member, thereby causing the port 18 in the active sprayer arm to be moved out of alinement with the adjacent port 19 of the valve member so as to shut off the supply of water to the active sprayer tube. While this is occurring on one side of the valve member, the same relative rotation of the sprayer member with respect to the now stationary valve member will bring the ports 18 and 19 on the opposite sides of the valve member into alinement, thereby admitting water to the opposite sprayer arm from that which had previously received the same. This action of the valve of the appliance and consequent shifting of the water supply from one to the other of the sprayer arms may be effected at any desired rotationally separated points, but I preferably so dispose the ports 18 and 19 with respect to the lugs 20 and 22, and the stop elements 6 and 7, that the said transferring of the water supply will occur just before the partial rotation of the sprayer member is stopped by the said coöperating formations 6 and 7, thereby causing the back pressure of the water which has just started spraying from one of the sprayer arms to coöperate with the said stop formations in limiting the rotational movement of the sprayer member. By so doing, I stop the oscillating movement of the sprayer member at each extreme of its travel without the slamming which would otherwise result, so that I obtain a substantial cushioned and noiseless oscillating action.

It will be evident from Fig. 1 that when the water supply is transferred from the active sprayer arm 11$^a$ to the formerly passive sprayer arm 11$^b$, the back pressure of the water issuing from the arm 11$^b$ will then rotate the entire sprayer member to the position shown in dotted lines, whereupon a reversion of the water connection between the two arms will again oscillate the sprayer member in the original direction. Thus the device will continue to distribute sprays alternately in opposite directions, but always at one side of the dotted line 26 of Fig. 1. Consequently, if the said dotted line represents the edge of a sidewalk, my sprinkler may readily be used to spray the lawn close up to the sidewalk but without wetting the latter. So also, a person may approach the sprinkler at any time from the side on which the line 26 is drawn so as to change the location of the sprinkler while in action without getting his clothes wet. It will also be evident from Fig. 1 that since the water issuing from each aperture in the sprayer arms usually diverges in a fan-shaped spray, the extreme edge of the series of sprays issuing near the outer end of each sprayer arm will form an oblique angle with the axis of the said arm. Consequently, I preferably so dispose the stop formations 6 and 7 that the rotary movement of the sprayer member about its support will be somewhat less than one hundred eighty degrees, thereby permitting the said diverging of the sprays to cause the total distribution of the water substantially to cover a semi-circle.

While I have shown and described the lawn sprinkler of my invention as equipped with an adjusting screw 17 for controlling the fit between the substantially conical valve member and the element housing the same, I do not wish to be limited to this or other details of the construction herein disclosed, it being evident that the same might be modified in many particulars without departing from the spirit of my invention.

I claim as my invention:—

1. A lawn sprinkler comprising a hollow supporting member, a sprayer member pivoted thereon and presenting hollow arms extending in opposite directions therefrom, and a valve member interposed between said supporting and sprayer members and rotatable with respect to both thereof: said valve member having ports respectively connecting the bore of the supporting member with the bore of one or the other of said arms, according as the valve member is in one or the other of two positions.

2. A lawn sprinkler including a hollow vertical supporting member, a pair of hollow sprayer arms pivotally mounted thereon and extending in opposite directions therefrom, and a hollow valve member interposed between said supporting member and said arms and rotatable with respect to both thereof, said valve member having ports connecting the bore of the supporting member with the bore of one or the other of said arms according as the valve member is in one or the other of two positions: a source of water supply connected to said supporting member, each of said arms equipped on one side with water outlets, the back pressure of the water issuing from said outlets causing the arm equipped therewith to move about its pivotal mounting in a direction opposite to that in which the water is being discharged, and means connecting said arms and said valve for causing said motion of either arm to actuate the valve.

3. A lawn sprinkler including a hollow vertical supporting member, a pair of hollow sprayer arms pivotally mounted thereon and extending in opposite directions therefrom, a hollow valve member interposed between said supporting member and said arms and rotatable with respect to both thereof, said valve member having ports connecting the bore of the supporting member with the bore of one or the other of the said arms according as the valve is in one or the other of two positions: a source of water supply connected to said supporting member, each of said arms equipped on one side with water outlets, the back pressure of the water issuing from said outlets causing the arm equipped therewith to move about its pivotal mounting in a direction opposite to that in which the water is being discharged, stop means associated with said arms and said supporting member for limiting the movement of the former about its pivotal mounting upon the latter, and means connecting said arms and said valve for causing the said motion of either arm to actuate the valve when the arm is approaching one limit of its movement.

4. A lawn sprinkler comprising a hollow vertical support, a hollow member pivoted thereon and equipped with a pair of sprayer arms extending in substantially opposite directions from said support, a supply of water connected to said support, and a valve member interposed between said support and said hollow member and movable with respect to both thereof, said valve member and said hollow member each equipped with stop formations coöperating respectively with stop formations upon said support to limit the relative movement of the valve member and the hollow member respectively with respect to said support, the said valve member and each of said arms equipped with ports alining with each other when the said arm and valve member are in relative predetermined positions, the impact of the water flowing from the valve member into the said arm against the lateral walls of the port in said valve member normally maintaining the said ports in alinement and thereby causing said valve to rotate about said support in unison with said hollow member.

5. A lawn sprinkler comprising a hollow support, a hollow sprayer member housing the upper end of said support and equipped with sprayer arms extending in substantially opposite directions from said support, the said sprayer member being pivotally mounted upon said support and there being coöperating formations upon said sprayer member and said support for limiting the relative movement of the former about its said pivotal mounting; a valve member housed by said sprayer member and connected at one end to the bore of the said support, the said valve member movable with respect to said support, there being coöperating formations upon said valve member and said support for limiting the relative movement thereof, said valve member equipped with a pair of ports connecting the interior thereof respectively with the said sprayer arms when the valve member is in either of two different positions with respect to said support; said valve member and said hollow member equipped with relatively tapering surfaces adapted to form a closure for each of the sprayer arms when the said valve is in another position with respect to said sprayer arms; and means associated with said valve for vertically adjusting the position of the valve with respect to the hollow member.

6. In a lawn sprinkler, the combination with a hollow support, of a sprayer member and a valve member both pivoted thereon and both equipped with ports normally kept in alinement by the flow of water therethrough, of means for causing the back-pressure of water issuing from said sprayer member to partially rotate the latter about said support, and means for limiting the extent to which the said action of the flow of water through the ports maintains the ports of the sprayer and valve members in alinement during said partial rotation.

In testimony whereof I have signed my name in presence of two subscribing witnesses.

CHARLES WATSON.

Witnesses:
 ALBERT SCHEIBLE,
 G. M. NEVILLE.